(12) United States Patent
Hill et al.

(10) Patent No.: US 8,923,663 B2
(45) Date of Patent: Dec. 30, 2014

(54) DISTRIBUTED FIBRE OPTIC SENSING

(75) Inventors: David John Hill, Dorchester (GB);
Magnus McEwen-King, Farnborough (GB)

(73) Assignee: Optasense Holdings Limited (GB)

( * ) Notice: Subject to any disclaimer, the term of this patent is extended or adjusted under 35 U.S.C. 154(b) by 300 days.

(21) Appl. No.: 13/509,402

(22) PCT Filed: Nov. 12, 2010

(86) PCT No.: PCT/GB2010/002087
§ 371 (c)(1),
(2), (4) Date: May 11, 2012

(87) PCT Pub. No.: WO2011/058322
PCT Pub. Date: May 19, 2011

(65) Prior Publication Data
US 2012/0230628 A1 Sep. 13, 2012

(30) Foreign Application Priority Data
Nov. 13, 2009 (GB) .................................. 0919906.8

(51) Int. Cl.
*G02B 6/00* (2006.01)
*G01D 5/353* (2006.01)

(52) U.S. Cl.
CPC . *G01D 5/353* (2013.01); *G02B 6/00* (2013.01)
USPC .............................................. 385/12; 385/13

(58) Field of Classification Search
USPC ....................................... 385/12–13
See application file for complete search history.

(56) References Cited

U.S. PATENT DOCUMENTS

| 4,996,419 A | 2/1991 | Morey |
| 5,194,847 A | 3/1993 | Taylor et al. |
| 6,466,706 B1 * | 10/2002 | Go et al. ......................... 385/12 |
| 6,601,671 B1 | 8/2003 | Zhao et al. |

(Continued)

FOREIGN PATENT DOCUMENTS

| CN | 101539631 | 11/2011 |
| GB | 2442745 | 4/2008 |

OTHER PUBLICATIONS

Unpublished U.S. Appl. No. 13/509,425, filed May 11, 2012 entitled: Optic Fibres and Fibre Optic Sensing.

(Continued)

*Primary Examiner* — Rhonda Peace
(74) *Attorney, Agent, or Firm* — McDonnell Boehnen Hulbert & Berghoff LLP

(57) ABSTRACT

The invention relates to a distributed fiber optic sensor (104, 106) having a first spatial resolution (301, 303) and a second, different, spatial resolution (302, 304). The sensor, which may be a distributed acoustic sensor, has an optical source (112) configured to interrogate an optical fiber (104) with optical radiation and a detector (116) configured to detected optical radiation back-scattered from within the fiber. A processor (108) is configured to process the detected back-scatter radiation to provide a plurality of longitudinal sensing portions of fiber. The optical source and processor are adapted to provide the first and second spatial resolutions, for instance by changing the duration and/or separation of the optical pulses and analysis bins. The first and second spatial resolutions may be provided sequentially or simultaneously and the spatial resolution used may be varied as part of a default pattern or in response to a detection event.

26 Claims, 2 Drawing Sheets

(56) References Cited

U.S. PATENT DOCUMENTS

| | | |
|---|---|---|
| 6,913,079 B2 | 7/2005 | Tubel |
| 6,937,151 B1 | 8/2005 | Tapanes |
| 7,170,590 B2 * | 1/2007 | Kishida .................... 356/32 |
| 7,504,618 B2 * | 3/2009 | Hartog et al. ............ 250/227.14 |
| 7,652,245 B2 * | 1/2010 | Crickmore et al. ...... 250/227.12 |
| 7,742,157 B2 * | 6/2010 | Lewis et al. ............... 356/73.1 |
| 7,873,273 B2 * | 1/2011 | Koyamada .................... 398/28 |
| 2006/0018586 A1 | 1/2006 | Kishida |
| 2006/0028636 A1 | 2/2006 | Payton |
| 2006/0210269 A1 * | 9/2006 | Farhadiroushan et al. ..... 398/48 |
| 2008/0068586 A1 | 3/2008 | Kishida et al. |
| 2008/0277568 A1 * | 11/2008 | Crickmore et al. ...... 250/227.12 |
| 2009/0008536 A1 * | 1/2009 | Hartog et al. ............ 250/227.14 |
| 2009/0080828 A1 | 3/2009 | Nash et al. |
| 2010/0117830 A1 | 5/2010 | Strong et al. |
| 2012/0222487 A1 * | 9/2012 | Hill et al. ........................ 73/655 |
| 2012/0226452 A1 * | 9/2012 | Hill et al. ........................ 702/56 |
| 2012/0230628 A1 * | 9/2012 | Hill et al. ........................ 385/12 |
| 2012/0230629 A1 * | 9/2012 | Hill et al. ........................ 385/12 |
| 2012/0280117 A1 * | 11/2012 | Lewis et al. ............. 250/227.17 |
| 2013/0222811 A1 * | 8/2013 | Handerek .................... 356/477 |

OTHER PUBLICATIONS

Preliminary Amendment filed on May 11, 2012 in U.S. Appl. No. 13/509,425.

Unpublished U.S. Appl. No. 13/509,415, filed May 11, 2012 entitled: Fibre Optic Distributed Sensing.

Preliminary Amendment filed on May 11, 2012 in U.S. Appl. No. 13/509,415.

Unpublished U.S. Appl. No. 13/509,407, filed May 11, 2012 entitled: Improvements in Distributed Sensing.

Preliminary Amendment filed on May 11, 2012 in U.S. Appl. No. 13/509,407.

Blackmon et al., "Blue Rose Perimeter Defense and Security System", Proc. SPIE 6201, Sensors and Command, Control Communications and Intelligence (C31) Technologies for Homeland Security and Homeland Defense, May 10, 2006.

Jaaskelainen, "Fiber Optic Distributed Sensing Applications in Defense, Security and Energy", Proc. SPIE 7316, Fiber Optic Sensors and Applications VI, Apr. 27, 2009.

* cited by examiner

DISTRIBUTED FIBRE OPTIC SENSING

FIELD OF THE INVENTION

The present invention relates to fibre optic distributed sensing, and especially to fibre optic distributed acoustic sensing and to method and apparatus for improving the functionality of distributed fibre optic sensors.

BACKGROUND OF THE INVENTION

Various sensors utilizing optical fibres are known. Many such sensors rely on fibre optic point sensors or discrete reflection sites such as fibre Bragg gratings or the like being arranged along the length of an optical fibre. The returns from the discrete point sensors or reflection sites can be analysed to provide an indication of the temperature, strain and/or vibration in the vicinity of the discrete sensors or reflection sites.

Such sensors using discrete reflection sites or fibre optic point sensors require the optical fibre including the sensor portions to be specially fabricated. Further the distribution of the sensors within the optical fibre is fixed.

Fully distributed fibre optic sensors are also known in which the intrinsic scattering from a continuous length of optical fibre is used. Such sensors allow use of standard fibre optic cable without deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the sensor options are fully distributed throughout the entire optical fibre. As used in this specification the term distributed fibre optic sensor will be taken to mean a sensor in which the optical fibre itself constitutes the sensor and which does not rely on the presence of specific point sensors or deliberately introduced reflection or interference sites, that is an intrinsic fibre optic sensor.

Various types of distributed fibre optic sensor are known and have been proposed for use in various applications.

U.S. Pat. No. 5,194,847 describes a distributed acoustic fibre optic sensor for intrusion sensing. A continuous optical fibre without any point sensors or specific reflection sites is used. Coherent light is launched into the optical fibre and any light which is Rayleigh backscattered within the optical fibre is detected and analysed. A change in the backscattered light in a time bin is indicative of an acoustic or pressure wave incident on the relevant portion of optical fibre. In this way acoustic disturbances at any portion of the fibre can be detected.

GB patent application publication No. 2,442,745 describes a distributed acoustic fibre optic sensor system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

Distributed fibre optic sensing therefore provides useful and convenient sensing solutions that can monitor long lengths of optical fibre with good spatial resolution. For instance a distributed fibre optic acoustic sensor, for instance as may be used for monitoring a pipeline, can be implement with sensing portions 10 m long in up to 40 km or more of optical fibre.

SUMMARY OF THE INVENTION

It is an aim of the present invention to provide a distributed fibre optic sensing system with increased flexibility and/or utility.

Thus according to the present invention there is provided a distributed fibre optic sensor comprising an optical source configured to interrogate an optical fibre with optical radiation, a detector configured to detect optical radiation back-scattered from within the fibre and a processor configured to process the detected back-scatter radiation to provide a plurality of longitudinal sensing portions of fibre wherein the optical source and processor are adapted to provide a first spatial resolution and at least a second, different spatial resolution.

The distributed fibre optic sensor of the present invention transmits optical radiation into a sensing optical fibre, detects radiation back-scattered from within the fibre and processes the radiation so as to define and to generate measurement signals from each of a plurality of longitudinal sensing portions of the fibre as is conventional in distributed fibre optic sensing. Each longitudinal sensing portion of fibre can therefore be considered as a separate sensor or data channel and the optical fibre can effectively be seen as a series of independent sensors (which may or may not be contiguous). However, in embodiments of the present invention a sensor is afforded which exhibits a first spatial resolution and/or a second different spatial resolution. In other words the size of the longitudinal sensing portions of the fibre are configurable such that each sensing portion of fibre may be either a first length or at least a second length, different to the first. Different embodiments of the invention control the variation in spatial resolution in different ways. Techniques such as temporal variation, adaptive variation in response to a detected event, simultaneous provision of multiple resolutions, eg by wavelength multiplexing are described below in more detail. In conventional distributed fibre optic sensing the spatial resolution, i.e. the basic length of the sensing portions of fibre, is fixed.

The optical source may be arranged to interrogate the optical fibre with one or more pulses of optical radiation. Each pulse effectively illuminates a section of the fibre and back-scatter from that section of the fibre can be detected by the detector. In certain embodiments the lengths of the longitudinal sensing portions of the fibre are determined by the duration, or width of the optical pulse or pulses being used to interrogate the fibre. In essence scattering caused by light in the middle of the pulse will reach the detector at the same time as light from other parts of the fibre illuminated by earlier or later bits of the pulse.

Thus the optical source may be configured to interrogate the optical fibre with pulses of optical radiation of a first duration and also to interrogate the optical fibre with pulses of optical radiation of second duration. By changing the duration of the pulse of optical radiation the spatial resolution of the sensor, i.e. the length of the sensing portions of fibre, can be varied.

In a distributed acoustic sensor such as described in GB2,442,745 pairs of pulses are used for each interrogation, with a frequency difference between each pulse in a pair. In certain distributed sensing arrangements then, pairs of pulses are used, and the relative phases of backscattered light from each one of a pair of pulses can be used to provide sensed data.

In such embodiments the length of the longitudinal sensing portions of the fibre is related to the separation between pulses in an interrogating pair.

Therefore in embodiments of the invention the optical source is configured to interrogate the optical fibre with pairs of pulses of optical radiation having a defined temporal separation, and wherein interrogation is performed with pairs of pulses of a first temporal separation and also with pairs of pulses of a second temporal separation. In such embodiments the variation in temporal separation effects a variation in spatial resolution.

A frequency difference is typically imposed on the pulses in each pair to facilitate detection and processing of signal returns. The pulses in the pair will be of finite duration, and the temporal separation is preferably defined as the separation between leading edges, or alternatively between the centre of the pulses for example. Designing an appropriate waveform for an interrogating pulse pair involves consideration of a number of factors, such as mark space ratio, total energy, extinction ratio, and frequency overlap for example. Therefore, in varying the pulse separation, other factors such as the pulse width may also be varied.

The optical source may be arranged to launch one or more pulses of a first duration and/or separation into the optical fibre to perform one or more interrogations of the fibre and then subsequently launch one or more pulses of a second duration and/or separation into the fibre to perform one or more subsequent interrogations of the fibre.

In other words the sensor may perform a first measurement or series of measurements at a first spatial resolution, and then subsequently perform a second measurement or series of measurements at a second spatial resolution. Thus the sensor provides a first spatial resolution at a first time and a second spatial resolution at a later time. The apparatus may be arranged to change the duration of the pulses periodically, for instance the sensor may be configured to use a first spatial resolution for a certain number of measurements or a certain length of time and then use a second spatial resolution for another number of measurements or amount of time. Additionally or alternatively the sensor may be configured to change the spatial resolution in response to a detected event. For instance the sensor may have a default spatial resolution, or a default routine for changing the spatial resolution, which is used in normal operation. If a particular event is detected (which could simply be any detection above a certain threshold or could involve detecting a particular characteristic signal) the spatial resolution may be changed to a new spatial resolution or new pattern of varying spatial resolution.

For example a distributed acoustic sensor, may be used with a default spatial resolution of say 10 m. If an acoustic signal is detected in one of the longitudinal sensing portions, which are 10 m in length, the sensor may change to a spatial resolution which is shorter than 10 m in order to get a better spatial sensitivity, which may allow the source of the acoustic signals to be more accurately identified and located. Alternatively the sensor may quickly take a series of measurements at a range of different spatial resolutions. An acoustic source may produce a characteristic signal that is apparent at one spatial resolution but not at another and/or the comparison of the response at a range of spatial resolutions may allow the source to be more classified more accurately. If the sensor were to change the spatial resolution in response to a detected event the sensor may be arranged to only process the returns from longitudinal sensing portions of the fibre in the vicinity of the detected event. Moving to a spatial resolution which is much shorter than the default spatial resolution could increase the amount of processing required is returns from the whole sensing fibre are to be analysed. The increased processing overhead may be avoided by concentrating only on a section of the optical fibre of interest.

In some embodiments the optical source may interrogate the optical fibre using one or more pulses of optical radiation having a first duration and/or separation and one or more pulses of optical radiation having a second duration and/or separation wherein the pulses of optical radiation having the first duration and/or separation have a different optical characteristic to the pulses of the second duration and/or separation. The optical characteristic may be a frequency difference between pulses in a group of interrogating pulses and/or the wavelength of the pulses. The optical characteristic allows the interrogation signals which give rise to the different spatial resolutions to exist in the fibre simultaneously, but for their outputs to be distinguished and separated at the processor.

Were a single interrogating pulse to be used the optical source may therefore be configured to provide pulses of a first wavelength having a first duration and pulses of a second duration having a second wavelength. In this way the Rayleigh backscattered radiation from each of the pulses could be separated by wavelength division. Thus the fibre can be interrogated at one spatial resolution at the same time that the fibre is also being interrogated at a different spatial resolution.

Where pairs of pulses are used, such as described in GB 2,442,745, the frequency difference between pairs of pulses may be varied between successive pairs of pulses such that each pulse pair results in a unique carrier frequency. As described in GB 2,442,745 this allows more than one pulse pair to be propagating within the fibre at the same time to provide separate interrogations. GB 2,442,745 however does not teach that the separation or duration of the pulses in separate pulse pairs may be varied to provide different spatial resolutions. Again wavelength division techniques may also be used to separate the returns from different pulse pairs.

In this way the sensor fibre may be simultaneously interrogated at a first spatial resolution and a second spatial resolution.

Again there may be a default spatial resolution used for general monitoring. For instance a single spatial resolution may be used unless and until an event of interest is detected, at which point the sensor may begin interrogating simultaneously at one or more other spatial frequencies, or with a particular pattern of varying spatial frequency, in order to classify and/or locate the source of the disturbance. Again it is noted that the processing overhead involved in analysing the signals from many longitudinal sensing portions may be significant. Thus although it may be possible to monitor a length of fibre at a 1 m resolution, say, it may be preferred to monitor at a default 10 m to detect any disturbance and, if a disturbance is detected, uses pulses of a shorter duration but only analyse the relevant section of interest. In one embodiment the optical source may, in normal operation, transmit pulses of different duration to allow simultaneous use of different spatial resolutions. However the processor may be arranged to only process the returns corresponding to the longer spatial resolution until an event of interest is detected. At this point the relevant returns from the pulses corresponding to the shorter spatial resolution may also be processed. This avoids any delay in instructing the optical source to output pulses at a shorter wavelength and any time of flight delay. Indeed the data corresponding to the returns from the pulses providing the shorter spatial resolution may be stored, at least for a short time, such that if an event is detected at the longer spatial resolution the stored contemporaneous returns for the shorter spatial resolution can be processed.

Whilst the optical radiation transmitted by the optical source may therefore physically define the achievable spatial resolution of the sensor, the processor should also be configured to process the signal returns into appropriate analysis bins. Therefore the processor is preferably configured to effect a plurality of longitudinal sensing portions of fibre of an appropriate length, that is they correspond to the spatial resolution, or at least one of the possible spatial resolutions, defined by the interrogating radiation. The processor may be arranged to alter the time analysis bins used in processing the data in response to changes in the interrogating optical radiation.

The processor may be arranged to average data from a section of the fibre which is longer than the minimum achievable longitudinal sensing portions of the optical fibre. For example if the optical radiation used to interrogate the optical fibre is such that the fibre could be resolved into discrete 5 m sections of fibre, the processor may nevertheless be arranged to only provide measurements which correspond to 15 m lengths of fibre. In effect the processor is just summing or averaging the data from three adjacent longitudinal sensing portions of fibre. The processor could also be configured to provide measurements purporting to correspond to lengths of fibre shorter than the achievable spatial resolution although it will be appreciated that this simply corresponds to displaying the data in a different way and doesn't actually increase the precision of the sensor. Whilst a change in the resolution of the data reporting may therefore be implemented by the processor without any change to the interrogating radiation, the present invention relates to methods and apparatus operable with at least two different spatial resolutions of the sensor, i.e. the minimum achievable lengths of each discrete sensing portion.

The processor (or another processor) may be arranged to analyse the signal returns from each of the longitudinal sensing portions to detect events of interest. Detecting an event of interest may comprise indentifying a pre-determined characteristic of the event in the measurement signals from one or more longitudinal sensing portions of the optical fibre. For example a distributed fibre optic acoustic sensor may compare the measurement signals, i.e. the detected acoustic signals, from each longitudinal sensing portion, or groups of adjacent longitudinal sensing portions, with an acoustic signature of an event of interest. If the measured signal matches or is sufficiently similar to the acoustic signature of the particular event of interest this may be taken as a detection of the particular event of interest.

This analysis may vary depending upon the spatial resolution of the sensor. For example a characteristic which is detected in a single longitudinal sensing portion at a longer spatial resolution may be detectable in more than one adjacent longitudinal sensing portion at a shorter spatial resolution. Therefore the pre-determined characteristic of an event of interest may have a spatial element to it.

Preferably the sensor is a distributed acoustic sensor (DAS). The detector may therefore be configured to detect radiation which is Rayleigh back-scattered from within the optical fibre. Preferably the processor is adapted to process the detected back-scatter radiation to derive an acoustic measurement from each of the longitudinal sensing portions. The processor may be adapted to perform a method such as described in GB 2,442,745.

The present invention also applies to a method of distributed fibre optic sensing. Thus according to another aspect of the invention there is provided a method of distributed fibre optic sensing comprising the steps of interrogating an optical fibre with optical radiation, detecting optical radiation which is back-scattered from the optical fibre and processing data corresponding to said detected back-scattered radiation to provide a measurement signal from each of a plurality of longitudinal sensing portions of said optical fibre wherein the method comprises providing said measurements at a first spatial resolution and a second, different spatial resolution.

The method of this aspect of the present invention offers all of the same advantages and can be used in all of the same embodiments as described above in relation to the first aspect of the invention.

In particular the step of interrogating the optical fibre with optical radiation may comprise launching one or more pulses of optical radiation having a first duration and/or separation into said optical fibre and launching one or more pulses of optical radiation having a second, different duration and/or separation into said optical fibre. As explained above, the different waveforms described by the duration and/or separation of the respective interrogation signals gives rise to the different spatial resolutions.

The method may comprise launching a first interrogating waveform giving rise to a first spatial resolution and launching a second interrogating waveform giving rise to a second spatial resolution wherein said first and second waveforms have a different optical characteristics. The optical characteristic may be wavelength and/or a frequency difference between the pulses in the pair.

The method may comprise providing measurements at the first spatial resolution and then subsequently providing measurements at the second spatial resolution.

The method may comprise changing the spatial resolution of the sensor in a predetermined pattern. Additionally or alternatively the method may involve changing the spatial resolution in response to detection of an event.

The method may comprise providing said measurements at the second spatial resolution only for a portion of the fibre in the vicinity of a detected event.

The method may comprise providing measurements at the first spatial resolution simultaneously with measurements at the second spatial resolution.

The method may comprise varying the size of analysis bins used by the processor to match the spatial resolution of the interrogating radiation.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
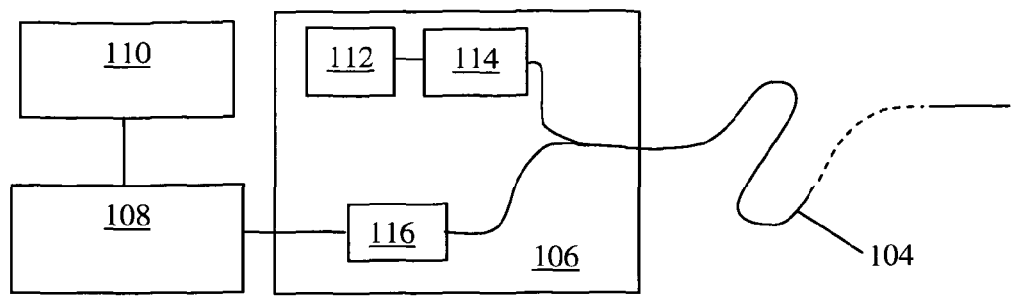
FIG. 1 illustrates the basic components of a distributed fibre optic sensor.

FIG. 1 shows a schematic of a distributed fibre optic sensing arrangement. A length of sensing fibre 104 is connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length, and in this example is approximately 40 km long. The sensing fibre is a standard, unmodified single mode optic fibre such as is routinely used in telecommunications applications. In conventional applications of optical fibre distributed sensors the sensing fibre is at least partly contained within a medium which it is wished to monitor. For example, the fibre 104 may be buried in the ground to provide monitoring of a perimeter or monitoring of a buried asset such as a pipeline or the like.

The invention will be described in relation to a distributed acoustic sensor, although the skilled person will appreciate that the teaching may be generally applicable to any type of distributed fibre optic sensor.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB 2,442,745 the contents of which are hereby incorporated by reference thereto. As described in GB 2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB 2,442,745. The signal processor may also apply a phase unwrap algorithm as described in GB 2,442,745.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion.

The spatial resolution of the sensing portions of optical fibre depends largely on the waveform of radiation used to interrogate the optical fibre. Here waveform typically refers to shape and timing of input pulses. As the skilled person will appreciate any illuminating pulse of optical radiation of finite duration will mean that a certain spatial length of the fibre is simultaneously illuminated at any one time. Thus, considering certain embodiments, radiation which is received at the detector at any one time will comprise radiation which has been back-scattered from slightly different parts of the fibre by different parts of the interrogating pulse. Clearly the speed of response and sampling speed of the detector may effect the spatial resolution but, in a well adjusted system the spatial resolution is effectively based on the pulse duration in such embodiments.

In some arrangements as described above, temporally spaced pairs of pulses are used to interrogate a fibre under test. In this approach, detection and processing is typically performed by interfering light which has passed through a given section of fibre—which section is defined by the pulse separation—with light which has not. Detected phase changes between the interfered light provides information concerning disturbances of the given section of fibre. Therefore the spatial resolution of the sensor, i.e. the length of each longitudinal sensing portion, depends on the separation of the optical pulses. The choice of interrogating waveform, and hence spatial resolution of the fibre, may depend on a number of factors. Clearly the intended application may influence the choice of spatial resolution. If the application is for detecting very large scale events a relatively large spatial sensing length may be acceptable. However for other applications there may be a range of useful spatial resolutions. Distributed acoustic sensors may be used as intrusion detection systems, for instance for protecting borders or perimeters or detecting potential interference with a pipeline say. Distributed acoustic sensors may also be used for flow monitoring and/or condition monitoring in relation to pipeline or other flow lines or for in condition monitoring for various buildings or structures.

Choice of spatial resolution also represents a trade off between sensitivity and noise and also the length of fibre that can be used as a sensing fibre. Use of longer sensing portions of fibre means that each sensing portion may be more sensitive—as there is more fibre to detect an incident acoustic disturbance. However the longer the sensing portion of fibre the greater the amount of noise. If the spatial size of the longitudinal sensing portions is too great, the additional sensitivity gains may be offset as the acoustic signal may be attenuated towards the end of the sensing portion and the additional noise may dominate. Whereas a sensing portion too small may exhibit only a relatively small signal. Further the use of small sensing portions may increase the overall number of effective sensor. This may significantly increase the processing overhead in determining the acoustic characteristics of some signals of interest.

The range of the sensor, or length of fibre that can be interrogated, is also related to the duration of the interrogating pulses. As will be appreciated the radiation which is back-scattered from any portion of the optical fibre must make it to the detector in order for the sensor to be able to detect the influence of acoustic disturbances on that portion of fibre. Clearly the optical fibre will exhibit some attenuation (some of the attenuation is due to the Rayleigh scattering processes from inhomogenities in the fibre) and thus the back-scattered radiation will be attenuated as it travels through the fibre. The greater the range into the fibre for a given sensing portion, the greater amount of optical fibre to be traversed to reach the detector and hence the greater the attenuation of the back-scatter. For a given degree of back-scatter there will be a range beyond which the attenuation on the return trip to the detector is too great and no useable signal can be achieved. The total back-scattered radiation from a sensing portion is related to the intensity of the interrogating radiation and the duration of the pulse (a longer pulse gives more opportunity for back-scatter).

As the skilled person will appreciate, for a distributed acoustic sensor relying on Rayleigh back-scatter the interrogating radiation should be below a non-linear threshold for the optical fibre and thus there is a limit to the optical power that can be transmitted into the fibre. Therefore, for a fixed intensity of illuminating radiation the degree of back-scatter is related to the duration of the illuminating pulse.

Weighing all these factors it has been found that a spatial resolution of the order of 8-12 m is particularly suitable for many applications of distributed acoustic sensors. This spatial resolution allows up to 50 km or more of standard telecoms fibre to be used as a sensing fibre and provides a good balance of noise and sensitivity. Further for many intrusion detection events and/or condition monitoring events a spatial resolution of 8-12 m is suited to the expected signals of interest and does not represent an undue processing overhead. That a range of 8-12 m represents a particularly suitable spatial resolution is a novel recognition.

In some application however, such as in down-well applications, a shorter spatial resolution may be appropriate. For instance in down-well application a spatial resolution of the order of a few tens of centimeters may be preferable. Over length scales of the order of a few kilometers, i.e. the depth of bore-holes, such a spatial resolution may be acceptable.

The present invention relates to a distributed fibre optic sensor, especially a distributed acoustic sensor, operable at at least two different spatial resolutions. This can allow additional information about a source of acoustic disturbances to be detected and or can allow different parts of a fibre to be monitored using different spatial resolutions.

Figure 2:
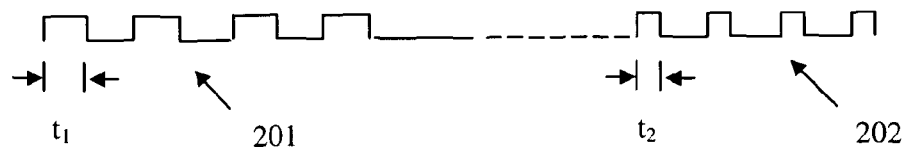
FIG. 2 illustrates a series of interrogating pulses according to one embodiment of the invention.

In a first embodiment of the present invention therefore the optical source of the interrogator, i.e. laser 116 and modulator 114 may be arranged to produce either a series of pulses of a first duration or a series of pulses of a second duration. Referring to FIG. 2 the output of the laser and modulator is shown.

The output of the modulator 114 is a series of pulses 201 each having a first duration $t_1$. The time between pulses may be arranged such that all back-scatter from one pulse is detected before the next pulse is launched into the fibre.

The detector receives the back-scattered radiation from the fibre and in processing the data the processor divides the data into n analysis bins, each of which has a spatial extent which is appropriate for the pulses of first duration $t_1$. The processor therefore provide an acoustic measurement signal from each of a plurality of sensing portions of fibre, with a first spatial resolution, say 10 m.

After producing one or more pulses 201 with the first duration however the laser 112 and modulator 114 output one or more pulses 202 with a different duration $t_2$. Apart from the duration of each pulse, all other features of the pulse may be unchanged. The duration of the pulses may be controlled by controlling the laser 112 to output pulses of a different duration, or modulator 114 or an additional optical modulator (not shown) could be used as would be understood by one skilled in the art.

As illustrated the pulses of the second duration have a shorter duration for each pulse and thus enable a shorter spatial resolution.

At the time that the laser and modulator start producing the pulses of the second duration the processor changes the size of the analysis bins and thus produces a series of measurement signals from each of a plurality of measurement portions of the fibre with a different, shorter spatial resolution, say 2 m for example.

Figure 3:
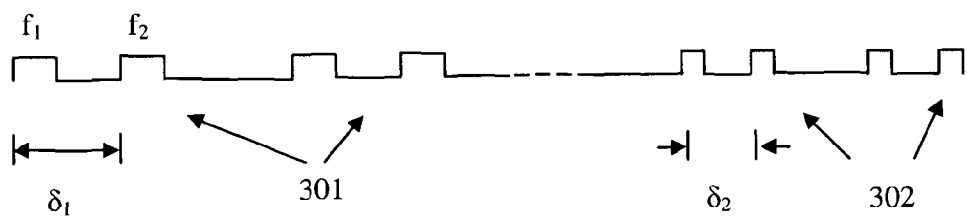
FIG. 3 illustrates a series of interrogating pulses according to another embodiment of the invention.

Referring to FIG. 3, waveforms for an embodiment in which pulse pairs are generated are illustrated. The output of the modulator 114 is a pair of pulses 301 having a separation $\delta_1$. Each pulse of the pair is of the same duration but each pulse is a different frequency to provide a known frequency difference. This is followed by another pulse pair a short time later The time between pulse pairs may be arranged such that all back-scatter from the first pulse pair is detected before the next pulse pair is launched into the fibre, in which case each pulse pair may be identical to the previous pulse pair. Alternatively, as described in GB2,442,745 the pulse pairs may be launched such that more than one pulse pair is propagating in the fibre at any time, in which each case pulse pair is arranged to have a different frequency difference.

The detector receives the back-scattered radiation from the fibre and the processor demodulates the detected radiation at the frequency difference of the pulse pair as described in GB2,442,745. In processing the data the processor divides the data into n analysis bins, each of which has a spatial extent which is appropriate for the pulse pairs of first separation $\delta_1$. The processor therefore provide an acoustic measurement signal from each of a plurality of sensing portions of fibre, with a first spatial resolution, say 10 m.

After producing a series of pulse pairs 301 with the first separation however the laser 112 and modulator 114 output one or more pulse pairs 302 with a different separation $\delta_2$. The duration of individual pulses in each of pairs 302 may be the same as that in pairs 301, however, in balancing various factors such as total energy, and frequency separation, the duration of individual pulses may also be different. As illustrated in FIG. 3, the pulse pairs 302 of the second separation have a shorter duration for each pulse.

At the time that the laser and modulator start producing the pulse pairs of the second separation the processor changes the size of the analysis bins and thus produces a series of measurement signals from each of a plurality of measurement portions of the fibre with a different, shorter spatial resolution, say 2 m for example.

Figure 4:
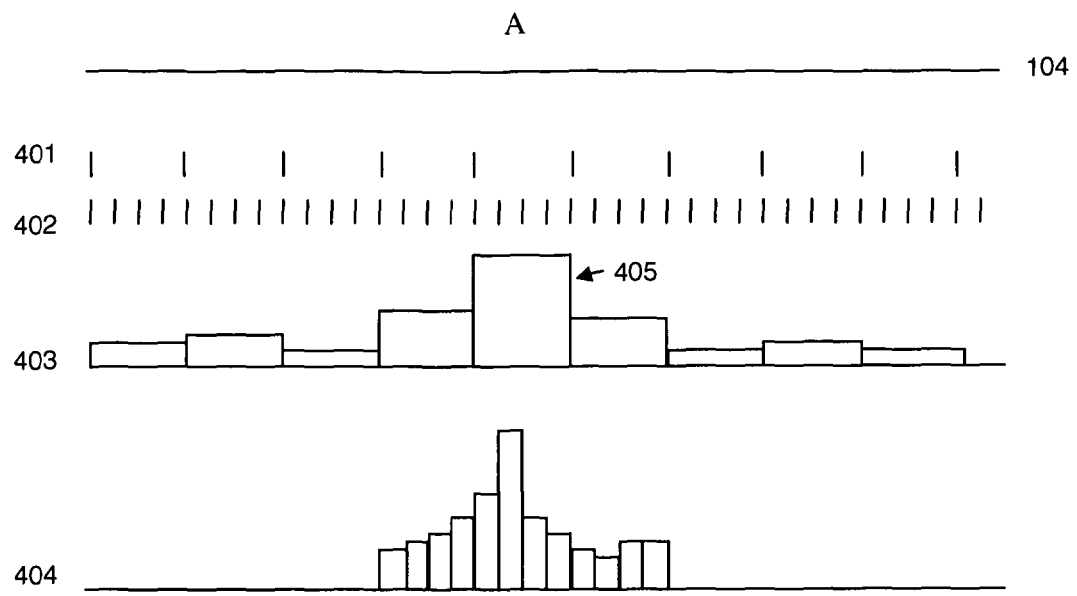
FIG. 4 illustrates a section of sensing fibre and the division of the fibre into longitudinal sensing portions at two different spatial resolutions.

In this way the sensor can swap between a first spatial resolution and a second spatial resolution. FIG. 4 illustrates an optical fibre 104 and indicates how the fibre is divided into sensing portions in the first spatial resolution 401 and the division of the fibre at the second spatial resolution.

The sensor may be arranged to swap between different spatial resolutions in a pre-determined pattern. For example the sensor may interrogate the fibre with a certain number of pulse pairs of the first duration followed by a certain number of pulse pairs of a second duration. Alternatively the sensor may operate at the first spatial resolution as a default spatial resolution. If an acoustic event above a certain threshold, and/or matching a certain characteristic is detected in the signals from any one or more of the sensing portions of the fibre, the sensor may swap to the second spatial resolution.

As will be clear from the foregoing the second spatial resolution provides potentially many more discrete sensing portions of fibre and thus may result in a significant processing overhead. In some embodiments therefore the processor may be arranged to provide measurement signals from only the longitudinal sensing portions in the vicinity of the detected event.

FIG. 4 illustrates an acoustic event occurring at position A. The acoustic waves will be detected by the fibre 104. Plot 403 shows a histogram representing the average acoustic signal intensity for each of the sensing portions of fibre at the first spatial resolution. It can be seen that a relatively large disturbance is detected in the relevant sensing portion 405. The processor may then switch to the second spatial resolution but only process the signals which correspond to the sensing portions of the second spatial resolution in the vicinity of section 405 of fibre. Plot 404 shows a histogram of the acoustic signal for each of the processed sensing portions at the second spatial resolution.

It can be seen that at the second spatial resolution the location of the acoustic event along the fibre can be more clearly determined. Further the analysis of the evolution of the acoustic signal over one or more of these sensing portions may reveal a characteristic signature that can be used to classify the event, i.e. identify the type of event which would produce such an acoustic response. This may enable the processor to determine whether the acoustic event is one of interest, for example indicative of an intruder or a fault conditions and thus an automated alarm should be generated.

As shown in FIG. 2 the interrogator may swap between different interrogating waveforms, and hence between spatial resolutions either in response to event or as part of a standard pattern. In another embodiment however two spatial resolutions may be simultaneously realised in the same fibre.

Figure 5:
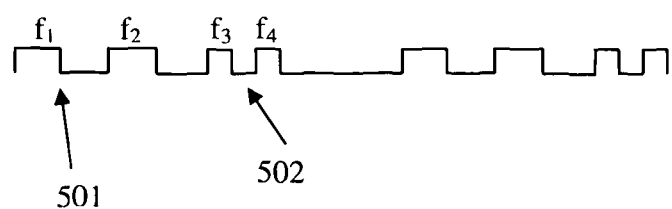
FIG. 5 illustrates a series of interrogating pulses according to another embodiment of the invention.

FIG. 5 shows the output of an interrogator according to this embodiment of the invention. A first pulse pair 501 having a first duration is transmitted into the fibre as described above. The pulses in the first pulse pair have frequencies $f_1$ and $f_2$ respectively. Immediately after the first pulse pair is transmitted a second pulse pair 502 is transmitted. The pulse in the second pulse pair have a different separation, and optionally different duration also and have frequencies $f_3$ and $f_4$ respectively. The frequencies are chosen such that $f_2-f_1$ does not equal any of $f_1$, $f_2$, $f_3$ or $f_4$ or $f_4-f_3$. Similarly $f_4-f_3$ does not equal $f_1$, $f_2$, $f_3$ or $f_4$. As described in GB 2,442,745 this arrangement can allow the two pulse pairs to be almost simultaneously transmitted into the fibre (indeed in a different apparatus they could be simultaneous) but the response from each to be demodulated separately. In this way signal returns at a first spatial resolution may be processed and also signals returns at a second spatial resolution may be processed to provide two simultaneous spatial resolutions.

The processor may provide measurement signals at both spatial resolutions for the whole of the fibre and may use the signals at both spatial resolutions to detect events of interest. Alternatively measurement signals at one of the spatial resolutions may be produced for only part of the optical fibre. For instance imagine that the optical fibre is deployed along the length of a buried pipeline for detecting interference with the pipeline and/or condition monitoring. For most of the pipeline a spatial resolution of 10 m or so may be acceptable and provide optimal monitoring. For some areas however, there may be other machinery or parts of the pipeline prone to particular stress, it may be desired to have a sensor with a spatial resolution of the order of 1 m. In this embodiment of the present invention the optical fibre can be interrogated with 1 m pulses and 10 m pulses. The returns from the 10 m pulses would be used for most of the pipeline but the 1 m pulses would be used for the sensitive portions.

Additionally or alternatively the shorter resolution pulses could be transmitted but the returns not processed for at least a section of the fibre until an event is detected. At which point the appropriate sensing portions could be analysed in a similar fashion to that described above in relation to FIG. 3.

In all instances the different spatial resolutions provided by the sensor may be predetermined, e.g. there may be a default resolution of 10 m say and a fine resolution of 1 m say. In some embodiments however the spatial resolution may be determined I response the signals detected. For instance the processor may analyse the signals at a first spatial resolution and, based on that analysis, choose a spatial resolution to apply in future.

It will of course be appreciated from the discussion above that, depending on where the event occurs in the optical fibre, and the overall length of fibre, changing the spatial resolution may vary the overall range of the sensor. Therefore for parts of the optical fibre which are towards the maximum range of the sensor at the particular spatial resolution it might not be possible to reduce the spatial resolution to a shorter length and still receive useable signals. However the use of two or more different spatial resolution may still be beneficial for the parts of the fibre which are within the effective range at both resolutions. The processor may be programmed with a series of cutoff ranges for varying the spatial resolution of certain parts of the fibre, i.e. a list of the shortest spatial resolution usable if an event occurs of interest occurs in a certain range.

Each feature disclosed in the description, and (where appropriate) the claims and drawings may be provided independently or in any appropriate combination.

The invention claimed is:

1. A distributed fibre optic sensor comprising an optical source configured to interrogate an optical fibre with optical radiation, a detector configured to detect optical radiation back-scattered from within the fibre and a processor configured to process the detected back-scatter radiation to provide a plurality of longitudinal sensing portions of fibre wherein the optical source is configured to launch one or more pulses effecting a first spatial resolution into the optical fibre to perform one or more interrogations of the fibre and to launch one or more pulses effecting a second different spatial resolution into the fibre to perform one or more different interrogations of the fibre and wherein the processor is configured to process said detected backscatter radiation at the first spatial resolution and at the second, different spatial resolution.

2. A distributed fibre optic sensor as claimed in claim 1 wherein the optical source is configured to interrogate the optical fibre with pulses of optical radiation of a first duration and also to interrogate the optical fibre with pulses of optical radiation of second different duration, said different durations effecting said different spatial resolutions.

3. A distributed fibre optic sensor as claimed in claim 2 wherein the optical source is configured to launch the one or more pulses effecting the first spatial resolution into the optical fibre to perform one or more interrogations of the fibre and then subsequently launch the one or more pulses effecting the second different spatial resolution into the fibre to perform one or more subsequent interrogations of the fibre.

4. A distributed fibre optic sensor as claimed in claim 1 wherein the optical source is configured to interrogate the optical fibre with pairs of pulses of optical radiation having a defined temporal separation, and wherein interrogation is performed with pairs of pulses of a first temporal separation and also with pairs of pulses of a second different temporal separation, said different separations effecting said different spatial resolutions.

5. A distributed fibre optic sensor as claimed in claim 1 wherein the sensor is adapted to perform a first measurement or series of measurements at a first spatial resolution, and then subsequently perform a second measurement or series of measurements at a second spatial resolution.

6. A distributed fibre optic sensor as claimed in claim 1 wherein the sensor is configured to periodically vary the spatial resolution of the sensor.

7. A distributed fibre optic sensor as claimed in claim 1 wherein the sensor is configured to change the spatial resolution of the sensor in response to a detected event.

8. A distributed fibre optic sensor as claimed in claim 1 wherein said one or more pulses effecting the first spatial resolution have a different optical characteristic to the one or more pulses effecting the second spatial resolution.

9. A distributed fibre optic sensor as claimed in claim 8 wherein the optical characteristic comprises one of a frequency difference between pulses in a group of interrogating pulses and the wavelength of the pulses.

10. A distributed fibre optic sensor as claimed in claim 1 wherein the sensor simultaneously provides the first spatial resolution and the second spatial resolution.

11. A distributed fibre optic sensor as claimed in claim 1 wherein the processor is configured to provide a plurality of longitudinal sensing portions of fibre with a length that matches the spatial resolution provided by the interrogating radiation.

12. A distributed fibre optic sensor as claimed in claim 11 wherein the processor is configured to alter time analysis bins used in processing the data in response to changes in the interrogating optical radiation.

13. A distributed fibre optic sensor as claimed in claim 1 wherein the processor is arranged to analyse the measurement signals from each of the longitudinal sensing portions to detect events of interest.

14. A distributed fibre optic sensor as claimed in claim 13 wherein the processor is arranged to vary the analysis depending upon the spatial resolution of the measurement signals.

15. A distributed fibre optic sensor as claimed in claim 1 wherein the sensor is a distributed acoustic sensor.

16. A distributed fibre optic sensor as claimed in claim 15 wherein the detector is configured to detect radiation which is Rayleigh back-scattered from within the optical fibre.

17. A method of distributed fibre optic sensing comprising the steps of interrogating an optical fibre with optical radiation, detecting optical radiation which is back-scattered from the optical fibre and processing data corresponding to said detected back-scattered radiation to provide a measurement signal from each of a plurality of longitudinal sensing portions of said optical fibre wherein the method comprises launching one or more pulses of optical radiation effecting a first spatial resolution into the optical fibre to perform one or more interrogations of the fibre and launching one or more pulses of optical radiation effecting a second different spatial resolution into the fibre to perform one or more different interrogations and said processing step comprises processing data at the first spatial resolution or second spatial resolution respectively.

18. A method of distributed fibre optic sensing as claimed in claim 17 wherein said one or more pulses of optical radiation effecting the first spatial resolution have a first duration and/or separation and said one or more pulses of optical radiation effecting the second spatial resolution have a second, different duration and/or separation.

19. A method of distributed fibre optic sensing as claimed in claim 18 comprising launching one or more pairs of pulses having the first duration and launching one or more pairs of pulses having the second duration wherein the pairs of pulses having the first duration have a different optical characteristic to the pairs of pulses having the second duration.

20. A method of distributed fibre optic sensing as claimed in claim 19 wherein the optical characteristic comprises wavelength and/or a frequency difference between the pulses in the pair.

21. A method of distributed fibre optic sensing as claimed in claim 17 comprising providing measurements at the first spatial resolution and then subsequently providing measurements at the second spatial resolution.

22. A method of distributed fibre optic sensing as claimed in claim 17 comprising changing the spatial resolution of the sensor in a predetermined pattern.

23. A method of distributed fibre optic sensing as claimed in claim 17 comprising the step of changing the spatial resolution in response to detection of an event.

24. A method of distributed fibre optic sensing as claimed in claim 23 comprising providing said measurements at the second spatial resolution only for a portion of the fibre in the vicinity of a detected event.

25. A method of distributed fibre optic sensing as claimed in claim 17 comprising providing measurements at the first spatial resolution simultaneously with measurements at the second spatial resolution.

26. A method of distributed fibre optic sensing as claimed in claim 17 comprising varying the size of analysis bins used by the processor to match the spatial resolution of the interrogating radiation.

* * * * *